(12) United States Patent
Taniguchi

(10) Patent No.: US 7,090,391 B2
(45) Date of Patent: Aug. 15, 2006

(54) APPARATUS AND METHOD FOR MIXING BY AGITATION IN A MULTICHAMBERED MIXING APPARATUS INCLUDING A PRE-AGITATION MIXING CHAMBER

(75) Inventor: Toru Taniguchi, Miyazaki-gun (JP)

(73) Assignee: Reika Kogyo Kabushiki Kaisha, Miyazaki (JP)

( * ) Notice: Subject to any disclaimer, the term of this patent is extended or adjusted under 35 U.S.C. 154(b) by 317 days.

(21) Appl. No.: 10/665,158

(22) Filed: Sep. 22, 2003

(65) Prior Publication Data

US 2004/0057332 A1 Mar. 25, 2004

(30) Foreign Application Priority Data

Sep. 25, 2002 (JP) ............................. 2003-278598
Jan. 29, 2003 (JP) ............................. 2003-21188
Jun. 27, 2003 (JP) ............................. 2003-185502

(51) Int. Cl.
B01F 11/00 (2006.01)
B01F 15/02 (2006.01)

(52) U.S. Cl. ...................... 366/118; 366/136; 366/307; 210/97; 210/194

(58) Field of Classification Search ........ 366/117–119, 366/174.1, 289, 332, 64–66, 192, 255–259, 366/307, 168.1, 136–137, 171.1; 210/97, 210/194, 197
See application file for complete search history.

(56) References Cited

U.S. PATENT DOCUMENTS

| | | | | |
|---|---|---|---|---|
| 974,336 A * | 11/1910 | Alt | ........................... | 366/166.1 |
| 2,604,386 A * | 7/1952 | Perry | .......................... | 510/405 |
| 2,615,692 A * | 10/1952 | Hans | ........................... | 366/273 |
| 2,667,407 A * | 1/1954 | Fenske et al. | ........... | 423/658.5 |
| 2,681,798 A * | 6/1954 | Hans | ........................... | 366/118 |
| 3,855,368 A * | 12/1974 | Prochazka et al. | ............ | 261/81 |
| 4,099,267 A * | 7/1978 | King | .......................... | 366/142 |
| 4,259,021 A * | 3/1981 | Goudy, Jr. | .................. | 366/118 |
| 4,737,349 A * | 4/1988 | Arnold et al. | .............. | 422/226 |
| 4,983,045 A * | 1/1991 | Taniguchi | ................... | 366/117 |
| 5,178,461 A * | 1/1993 | Taniguchi | ................... | 366/322 |
| 5,375,926 A * | 12/1994 | Omasa | ........................ | 366/118 |
| 5,391,000 A * | 2/1995 | Taniguchi | ................... | 366/332 |
| 5,730,856 A * | 3/1998 | Omasa | ........................ | 205/742 |
| 5,829,873 A * | 11/1998 | King | ........................ | 366/171.1 |
| 5,904,422 A * | 5/1999 | Kurtz | ........................ | 366/256 |
| 6,241,376 B1 * | 6/2001 | Schunemann et al. | ........ | 366/99 |
| 6,322,240 B1 * | 11/2001 | Omasa | ........................ | 366/118 |
| 6,605,252 B1 * | 8/2003 | Omasa | ........................ | 422/20 |

(Continued)

FOREIGN PATENT DOCUMENTS

DE 3628012 A1 * 2/1988

(Continued)

*Primary Examiner*—Charles E. Cooley
(74) *Attorney, Agent, or Firm*—Oliff & Berridge, PLC

(57) ABSTRACT

An apparatus for agitation mixing comprises a casing 12 including a flow channel through which fluid passes, an agitation body consisting of a shaft 14 installed in the casing 12 and connected to a motor 18 and an agitation blade 16 mounted on the perimeter of the shaft 14, a powder inlet 52 attached to the casing 12 to feed a powder 34 into the casing 12, a liquid inlet 50 attached to the casing 12 in the vicinity of the powder inlet 52 to feed a liquid 24 into the casing 12, a powder inlet duct 30 connected to the powder inlet 52, and an introducer 36 placed in the powder inlet duct 30 and connected to a motor 32.

5 Claims, 10 Drawing Sheets

U.S. PATENT DOCUMENTS

| | | | |
|---|---|---|---|
| 6,655,826 B1 * | 12/2003 | Leanos | 366/119 |
| 6,866,831 B1 * | 3/2005 | Nakao et al. | 210/413 |
| 2004/0057332 A1 * | 3/2004 | Taniguchi | 366/118 |
| 2005/0094486 A1 * | 5/2005 | Tanguchi | 366/171.1 |

FOREIGN PATENT DOCUMENTS

| | | | |
|---|---|---|---|
| DE | 4037957 A1 * | | 6/1992 |
| EP | 1508364 A1 * | | 2/2005 |
| GB | 689974 | | 4/1953 |
| GB | 876070 | | 8/1961 |
| GB | 994789 | | 6/1965 |
| JP | 62-125836 | * | 6/1987 |
| JP | 63-44927 | * | 2/1988 |
| JP | 1-231929 | * | 9/1989 |
| JP | 2-43933 | * | 2/1990 |
| JP | 2-293034 | * | 12/1990 |
| JP | 3-157129 | * | 7/1991 |
| JP | 3-258337 | * | 11/1991 |
| JP | 7-51557 | * | 2/1995 |
| JP | 10-328547 | * | 12/1998 |
| JP | A 11-19495 | | 1/1999 |
| JP | 11-57441 | * | 3/1999 |
| JP | 11-169697 | * | 6/1999 |
| JP | 11-226377 | * | 8/1999 |
| JP | 2000-51675 | * | 2/2000 |
| JP | 2000-176270 | * | 6/2000 |
| JP | A 2000-246131 | | 9/2000 |
| JP | A 2001-62273 | | 3/2001 |
| JP | A 2001-65850 | | 3/2001 |
| JP | A2001-198447 | | 7/2001 |
| JP | A 2002-166154 | | 6/2002 |
| JP | A 2002-248330 | | 9/2002 |
| JP | 2004-290837 | * | 10/2004 |
| JP | 2003-1083 | * | 1/2005 |
| JP | 2001-46850 | * | 2/2005 |
| JP | 2003-47833 | * | 2/2005 |
| JP | 2001-81326 | * | 3/2005 |
| JP | 2005-58916 | * | 3/2005 |
| JP | 2001-106704 | * | 4/2005 |
| JP | 2005-103340 | * | 4/2005 |
| JP | 2001-239140 | * | 9/2005 |

* cited by examiner

APPARATUS AND METHOD FOR MIXING BY AGITATION IN A MULTICHAMBERED MIXING APPARATUS INCLUDING A PRE-AGITATION MIXING CHAMBER

BACKGROUND OF THE INVENTION

1. Field of the Invention

The present invention relates to an apparatus and method for mixing by agitation, and more particularly to an apparatus and method applicable to a wide variety of uses involving the mixing of a powder and a liquid by agitation.

2. Description of the Related Art

In mixing processes which include adding a liquid to a powder, adding a powder to a liquid, or simultaneously adding a powder and a liquid, secondary agglomerates ("lumps") of the powder are often produced in the liquid, and, once they have been produced, it is usually extremely difficult to re-dissolve these lumps in the liquid.

Accordingly, in recent years apparatuses and methods for uniformly mixing powder and liquid while avoiding generation of secondary agglomerates during mixing of the powder and the liquid have been suggested.

In Japanese Patent Laid-Open Publications No. Hei 11-19495, No. 2001-62273, and No. 2002-166154, a continuous mixing device is disclosed. In the continuous mixing device, a rotary disc is installed in a casing to which, in an upper part thereof, supply ports for feeding a liquid and a powder are attached, and in a lower part thereof, a drain port is attached. The rotary disc separates the inside of the casing into an upper mixing chamber and a lower mixing chamber. Further, a scraper is attached to an upper area of the rotary disc, and a revolving scraper, which revolves independently of the rotary disc in a noncontact manner, is mounted at a position below the rotary disc. A powder and a liquid fed from the supply ports are mixed by rotating the rotary disc, and a resultant mixture moved into the lower mixing chamber is scraped off while being mixed so as to be transported continuously to the outside from the drain port by the revolving scraper which rotates at a lower speed than that of the rotary disc.

Further, in Japanese Patent Laid-Open Publications No. 2002-248330 and 2001-198447, a continuous mixing device for mixing powder and liquid through a rotary mixing disc, in which a liquid is fed in atomized form for uniformly mixing the powder and the liquid, is suggested.

In Japanese Patent Laid-Open Publication No. 2001-65850, it is suggested that, in a method for producing a slurry mixture by mixing a powder such as a coal powder and a liquid such as water, the powder is fed into a screw pump to which the liquid is further supplied in the midstream of the screw pump so as to be mixed with the powder, and the pressure in the screw pump is first boosted and then lowered at an exhaust port for transforming the mixture into slurry.

Still further, the applicant of the present invention has also suggested, in Japanese Patent Laid-Open Publication No. 2000-246131, a dispersing apparatus comprising a casing capable of containing two or more materials therein and a grinding spindle installed in the casing. In that dispersing apparatus, pits and projections are formed on at least either one of the inner wall of the casing or the outer side surface of the grinding spindle, and by reciprocating the grinding spindle with respect to the casing to produce a narrow pressure in a clearance between the inner surface of the casing and the outer side surface of the grinding spindle, at least one out of the two or more materials can be dispersed.

However, because in any one of the above mixing devices and mixing methods the uniformity of the mixing is inadequate, or the available combination of powder and liquid to be mixed is limited, the mixing often does not achieve the quality desired.

SUMMARY OF THE INVENTION

The present invention, which was conceived in view of the problem explained above, provides a versatile apparatus and method for mixing powder and liquid by agitation, one in which combinations of powder and liquid to be mixed are substantially unlimited, and which provides a superior ability to uniformly mix powder and liquid.

The apparatus and method for mixing by agitation according to the present invention have the following characteristics.

An apparatus for mixing by agitation according to the present invention comprises a casing having a flow channel through which passes a fluid; an agitation body consisting of a shaft installed in the casing and connected to a vibration source, and one or more agitation blades attached to the perimeter of the shaft; two or more inlets for feeding a liquid or a powder into the casing, and one or more agitating chambers separated from other regions in the casing by a divider plate in a state capable of communicating with the other regions. In the apparatus for mixing by agitation, at least one of the agitating chambers is a pre-agitation mixing chamber to which the inlets are attached, and a portion of the agitation blade to be positioned in the pre-agitation mixing chamber on the agitation body is provided in such a manner that the shape of the agitation blades and/or the agitation area of the agitation blades can be changed according to the degree of agitation.

In the apparatus for mixing by agitation as described above, one or more agitation blades of at least one type selected from a plurality of types of agitation blades each having a unique shape are mounted on the perimeter of the shaft of the agitation body.

By combining different shaped blades whose agitation areas vary according to the shape of the blades, the degree of agitation can be adjusted in the flow channel in the casing.

In the apparatuses described above, the divider plate may be perforated with one or more holes.

By providing one or more holes in the divider plate, the degree of agitation in the agitating chamber formed between the divider plates can be adjusted so as to differ from the degree of agitation in other agitating chambers.

In the apparatuses described above, the agitation blade may be perforated with one or more holes according to the agitation area.

By perforating the agitation blade with one or more holes, the degree of agitation in the agitating chamber locating within a range in which the portion of the agitation blade having the holes is able to vibrate can be adjusted so as to differ from the degree of agitation in other agitating chambers.

In the apparatuses described above, the number of the holes and/or the size of the holes may be set or changed so as to vary the degree of agitation within the casing.

By changing the number of the holes and/or the size of the holes, the agitation areas in the divider plate or the agitation blade can be modified, which in turn varies the degree of agitation in each of the agitating chambers as desired.

Another apparatus for mixing powder and liquid by agitation according to the present invention comprises a casing having a flow channel through which a fluid may pass; an agitation body consisting of a shaft installed in the casing and connected to a vibration source and an agitation blade attached to the perimeter of the shaft; a powder inlet mounted on the casing to feed a powder into the casing; and a liquid inlet mounted on the casing in the vicinity of the powder inlet to feed a liquid into the casing.

Vibration of the agitation body in the casing allows a powder loaded from the powder inlet to be fed into the casing without residence. In this manner, because a substantially measured amount of the powder is constantly supplied while being kept free from clogging, the powder and the liquid can be mixed uniformly and successively. Further, an introducer with a helical blade or a shingle-shaft eccentric pump can feed the powder from a powder inlet duct into the casing at relatively high speed, the capability of manufacturing a slurry admixture of powder and liquid or a high-viscosity mixture is provided. Still further, by vibrating the agitation body in the casing to mix powder and liquid, uniform mixture of the powder and the liquid can be achieved without generating secondary agglomerate even in manufacturing of, for example, a slurry admixture or a high-viscosity mixture.

In an apparatus for mixing powder and liquid by agitation as described above, the powder inlet and the liquid inlet may both be placed at either an upper part of the casing or a lower part of the casing.

Because the supplied powder is then brought into contact with the supplied liquid at an early stage, a tendency to produce secondary agglomerate can be reduced.

In an apparatus for mixing powder and liquid by agitation as described above, a pre-agitation mixing chamber capable of communicating with other regions of the casing may further be mounted on either the upper part or the lower part of the casing, and the powder inlet and the liquid inlet may both be attached to the pre-agitation mixing chamber placed at either the upper part of the casing or the lower part of the casing.

By installing the pre-agitation mixing chamber in which the powder and the liquid are preliminary agitated through vibration so as to be mixed almost uniformly before full-scale vibratory agitation, further generation of secondary agglomerate can be prevented.

In an apparatus for mixing powder and liquid by agitation as described above, one or more agitation blades of at least one type selected from a plurality of types of agitation blades each having a unique shape may be mounted along the perimeter of the shaft of the agitation body.

By attaching one or more uniquely-shaped agitation blades to the perimeter of the shaft of the agitation body in accordance with properties of the powder and the liquid to be mixed by agitation or the like, uniformity and efficiency of agitation can be improved. For example, when a powder is fed from the upper part, by mounting the agitation blades, laid out so as not to overlap each other, on the upper part, the supplied powder can be kept from accumulating on the agitation blades, which ensures that the powder will be uniformly mixed with the liquid during preliminary vibratory agitation. By further installing helical blades on the perimeters in the middle and the lower parts of the shaft of the agitation body, vibration of the agitation body can cause great turbulence in a mixture of the powder and the liquid, which improves efficiency of mixing by agitation.

In an apparatus for mixing powder and liquid by agitation as described above, at least two packings, which allow outflow of the liquid from a vibration source side while protecting the vibration source from inflows of fluid, may be further installed in the casing, and the liquid inlet, situated at a position above or below the powder inlet, may be made capable of feeding the liquid into a space formed between the two packings.

By feeding the liquid from the space formed between the two packings, the powder fed from the powder inlet located below or above the liquid inlet can be brought into immediate contact with the liquid flowing from above or below, which prevents the powder from rising up and adhering to an upper inner wall of the casing, or from sticking on the upper part of the agitation body. In this manner, the powder and the liquid can be almost instantly mixed by agitation at a specified compounding ratio.

In an apparatus as described above, a filter may be further provided in the casing so as to enclose the agitation body.

By filtering an agitated mixture using the filter, a more uniform mixture can be obtained.

The apparatuses as described above may further comprise a filtered drain port from which a mixture filtered by the filter is drained out, and an unfiltered drain port from which a mixture incapable of being filtered by the filter is drained out, the apparatus in which the unfiltered drain port is connected to an open/close valve which opens when an internal pressure at the unfiltered drain port reaches to or goes beyond a predetermined value or an open/close valve which opens at regular time intervals.

In the apparatuses as described above, a coupling duct which connects the filtered drain port or the unfiltered drain port to the inlet duct may be provided.

By joining, for example, the unfiltered drain port to the inlet duct, a desired filtered mixture can be obtained at with an enhanced yield.

In a method for mixing powder and liquid by agitation according to the present invention, a powder and a liquid may be simultaneously or intermittently fed into a casing having a vibratory agitation blade and then agitated through vibration.

According to such a method, the powder and the liquid can be mixed by vibratory agitation uniformly without exerting a shearing force thereon.

A method for mixing powder and liquid according to the present invention may comprise the steps of mixed powder formation in which a mixed powder is prepared by blending at least two kinds of powders, and vibratory agitation in which the mixed powder and a liquid are fed into the casing simultaneously or intermittently and then agitated by vibration.

By vibratory agitation, two or more powders and a liquid, each having, for example, different properties, can be uniformly mixed.

In a method for mixing by agitation as described above, the degree of agitation may be changed as appropriate in the same flow channel in which fluid passes through.

In the same flow channel, uniform mixing by agitation can be achieved by combining rough agitation and thorough agitation in accordance with characteristics of mixing by agitation carried out on the mixture.

DESCRIPTION OF THE PREFERRED EMBODIMENTS

Referring to drawings, preferred embodiments of an apparatus and method for mixing by agitation according to the present invention will be described below.

Embodiment 1

Figure 1:
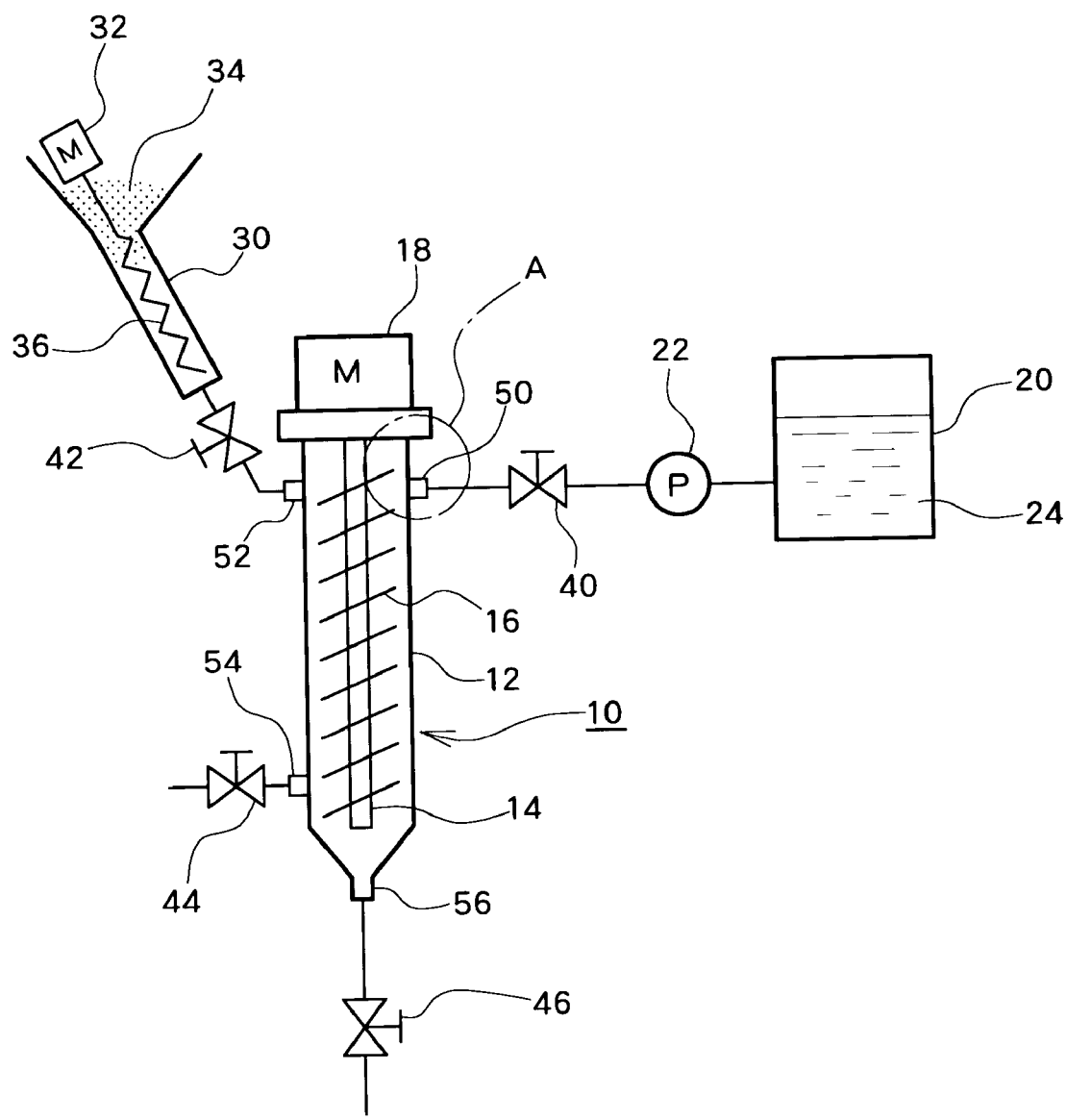
FIG. 1 shows a schematic structure of an apparatus for mixing by agitation according to first and second embodiments of the present invention.

As shown in FIG. 1, an apparatus for mixing powder and liquid by agitation 10 (hereinafter referred to as an "agitation mixer 10") according to the present embodiment comprises a casing 12 including a flow channel in which fluid passes through. In the casing 12, an agitation body consisting of a shaft 14 connected to a motor 18 of a vibration source and an agitation blade 16 attached to the perimeter of the shaft 14 is provided.

A powder inlet 52 for feeding a powder 34 into the casing 12 is mounted on an upper part of the casing 12, and a liquid inlet 50 for feeding a liquid 24 into the casing 12 is also mounted on the upper part of the casing 12 in the vicinity of the powder inlet 52. In this manner, the supplied powder contacts with the supplied liquid, which suppresses further generation of secondary agglomerate.

The liquid inlet 50 is connected, via a valve 40 and a pump 22, to a liquid reservoir 20 in which the liquid 24 to be mixed is stored. On the other hand, the powder inlet 52 is connected to a powder inlet duct 30 through a valve 42. It is preferable that the upper part of the powder inlet duct 30 is formed in a funnel shape. In order to feed a powder at a relatively high velocity, an introducer 36 consisting of an introduction shaft connected to a motor 32 being a driving source for rotation and a helical blade attached on the perimeter of the introduction shaft, or a single-shaft eccentric pump (for example, the commercially available NEMO® pump manufactured by HEISHIN Ltd.) are mounted on the powder inlet duct 30. It is desirable that the powder inlet duct 30 be installed in a slanting position relative to the casing 12, which facilitates smooth feeding of the powder 34 as well as preventing residence of the powder 34 in a pipe connecting the powder inlet duct 30 and the casing 12.

Supply ports 54, 56 mounted on the lower part of the casing 12 are connectable to the external via valves 44, 46, respectively. Further, an additional supply port (not illustrated) for feeding a second liquid into the casing 12 may be mounted on the casing 12 depicted in FIG. 1.

Operation of the agitation mixer 10 according to the first embodiment will be described below.

The valves 44 and 46 are closed first, and then the valves 42 and 40 are opened. Next, the pump 22 and the motor 32 are actuated at almost the same time to feed the liquid 24 and the powder 34 into the casing 12, and the motor 18 is actuated to vibrate the agitation body in the casing 12. It should be noted that the powder 34 can be fed into the casing 12 more smoothly because of the vibration of the agitation body installed in the casing 12. After feeding measured amounts of the powder 34 and the liquid 24 at a predetermined ratio into the casing 12, the valves 40 and 42 are closed to terminate feeding. After agitating the powder 34 and the liquid 24 for a fixed time period, the resulting mixture of the powder 34 and the liquid 24 uniformly mixed in the casing 12 is ejected to the outside through the supply port 56, which acts as a drain port after the valve 46 is opened.

Although the agitation mixer 10 was described with reference to mixing by agitation carried out in a batch mode, it is not limited to the use in the batch mode. The agitation mixer 10 may be used in a sequential mode in which, for example, the powder 34 and the liquid 24 are fed into the casing 12 at a predetermined ratio via the valves 40 and 42 which are always left opened, respectively, whereas the resulting mixture is ejected from the supply port 56 taken as a drain port via the valve 46 which is always left opened for continuously mixing the powder with the liquid.

Embodiment 2

According to a second embodiment of the present invention, in the agitation mixer shown in FIG. 1, the supply port 56 is connected to the pump 22 and the liquid reservoir 20 through the valve 46 and used instead of the liquid inlet 50, the supply port 54 is connected to the powder inlet duct 30 through the valve 44 and used instead of the powder inlet 52, and the liquid inlet 50 as described in the first embodiment is used as a drain port through which the mixture of the liquid 24 and the powder 34 is ejected. Because components other than those described above in the second embodiment correspond to the components of the agitation mixer according to the first embodiment, corresponding components are identified by the same reference number or character, and their description is not repeated.

By feeding the powder 34 and the liquid 24 into the casing 12 from bottom, the supplied powder 34 and the liquid 24 are agitated by vibration while working against gravity, which causes turbulence intensity to increase. The agitation mixer according to the second embodiment is suitable for uniformly agitating a slurry or high-viscosity mixture.

Embodiment 3

Figure 2:
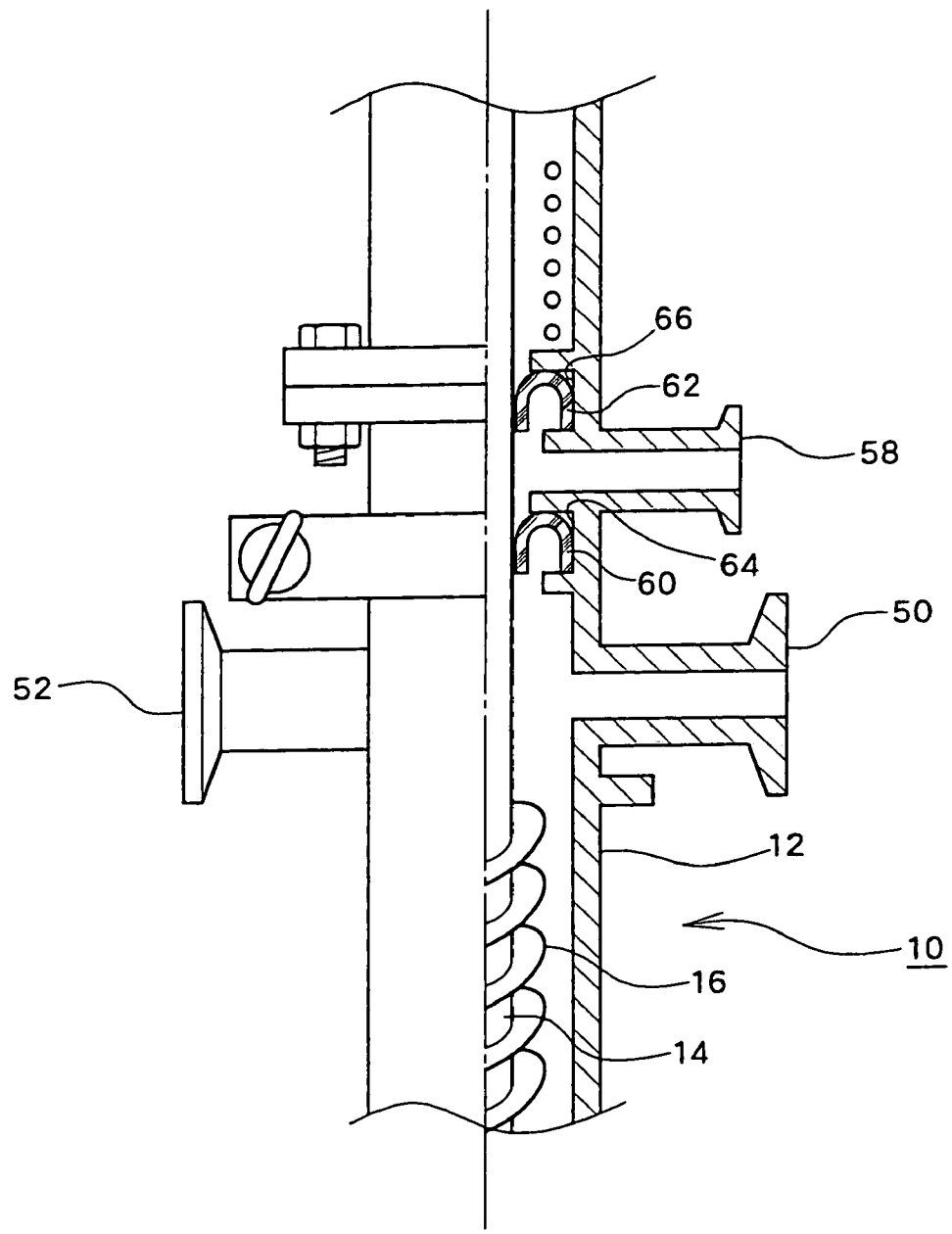
FIG. 2 is an expanded view of part A in FIG. 1 for explaining the double packing construction in an apparatus for mixing by agitation according to a third embodiment of the present invention.

In a third embodiment, a supply port 58 shown in FIG. 2 is used in place of the liquid inlet 50 shown in FIG. 1 in the agitation mixer depicted in FIG. 1, while other components correspond to those in the agitation mixer according to the previous embodiment. As above, corresponding components are identified by the same references and their description is not repeated. This is also true in all following embodiments.

In the present embodiment, the casing 12 has a double packing structure in order to prevent fluid from entering into the motor being a vibration source for vibrating the agitation body from an agitation mixing area in the casing 12. More specifically, as shown in FIG. 2, the double packing structure is such that an inverted U-shape packing 60 is attached to a packing stuffing box 64 in the vicinity of the agitation mixing area, whereas in the vicinity of a coil provided near the motor, an inverted U-shape packing 62 is attached to a packing stuffing box 66. The inverted U-shape packings 60 and 62 are provided in a manner that their respective one ends are fixed by the packing stuffing boxes 64 and 66 and the other ends remain free to contact the shaft 14. Accordingly, the inverted U-shape packings 60 and 62 have a configuration enabling the downward flow of a fluid, while preventing the inflow of a fluid from below. The supply port 58 may be joined with a space formed between the inverted U-shape packings 60 and 62, and the liquid reservoir 20 may be connected to the supply port 58 via the valve 40 and the pump 22 shown in FIG. 1, instead of the liquid inlet 50 in the first embodiment.

By loading the liquid 24 into the space within the double packing structure as described above, the powder 34 supplied from the powder inlet 52 can be immediately brought into contact with the liquid 24 flowing from above, which prevents the powder 34 from rising up into the upper part of the casing 12 to thereby adhere to the upper inner wall of the casing 12 or stick on the top part of the agitation body. In this manner, a powder/liquid-mixing ratio can be continuously maintained, which enables further improvement of mixing accuracy. Although a layout in which the motor 18 in the agitation mixer 10 shown in FIG. 1 is placed in the upper part of the agitation mixer 10 has been described, disposition of the motor 18 is not limited to this layout, and the motor 18 may be positioned in the lower part of the agitation mixer 10. In this case, agitation mixer 10 may be configured by turning the above-described structure upside down to carry out mixing by agitation.

Embodiment 4

Figure 3:
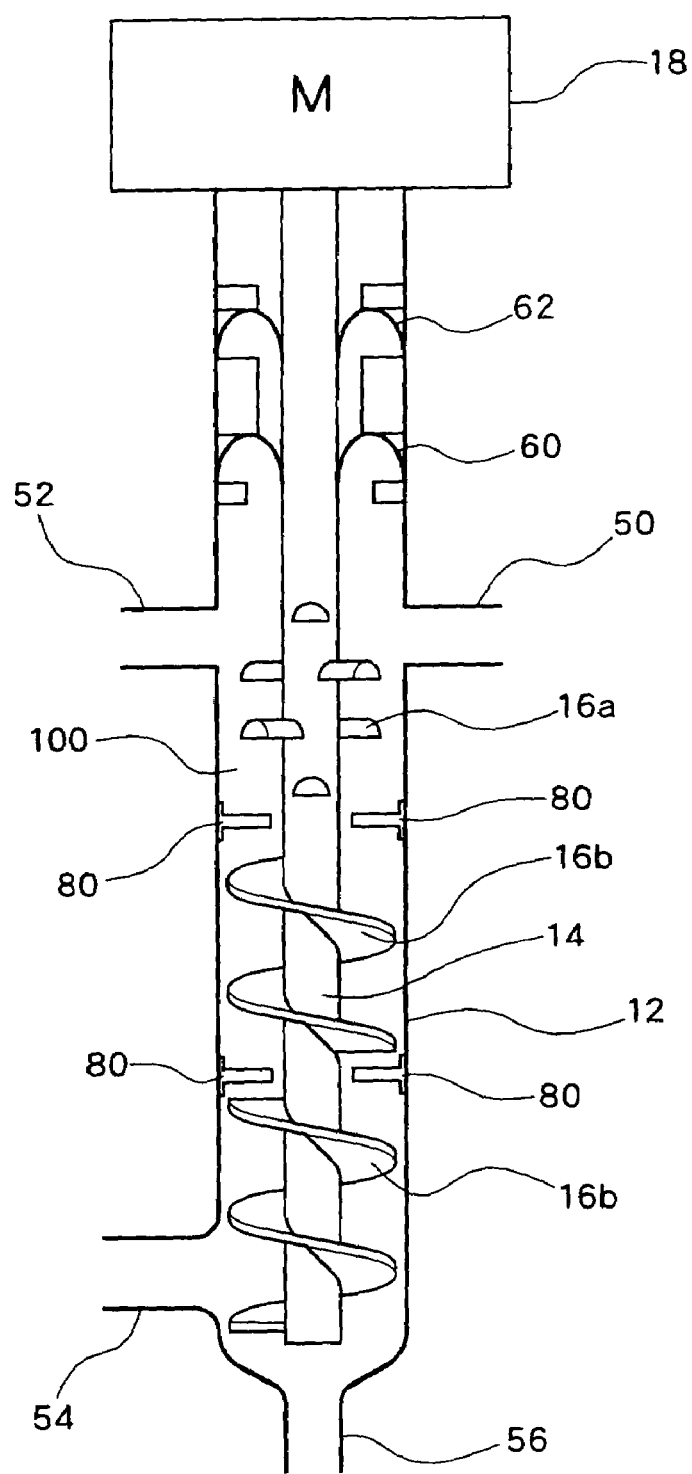
FIG. 3 is a schematic diagram showing a partial structure of a casing in an apparatus for mixing by agitation according to a fourth embodiment of the present invention.

In a fourth embodiment of the present invention, a pre-agitation mixing chamber 100 capable of communicating with other regions of the casing 12 is provided in the upper part of the casing 12 as shown in FIG. 3. The shaft 14 installed in the casing 12 is, in a segment corresponding to the pre-agitation mixing chamber 100, equipped with rod- or plate-shaped agitation blades 16*a* each having a top surface bowed outward which are shifted by, for example, 30–90 degrees from each other so as not to overlap, and a helical blade 16*b* is mounted on segments corresponding to the middle part and the lower part of the casing 12.

Because of the outwardly bowed top surfaces of the agitation blades 16*a*, when a powder is fed from the powder inlet 52 and a liquid is fed from the liquid inlet 50 into the casing 12, the supplied powder does not accumulate on the agitation blades 16*a*. By further vibrating the shaft 14, the powder can be mixed with the supplied liquid almost uniformly in the pre-agitation mixing chamber 100, and accuracy of the mixing ratio can be maintained, which in turn enables continuous mixing operations. Further, because accumulation of the powder on the shaft 14 is prevented, the mixing operation continues without interfering with movement of the shaft 14.

The relatively large turbulence created by the helical blades 16*b* in the casing 12 due to vibration of the agitation body contributes to enhancing the uniformity of the mixture of powder and liquid blended in the pre-agitation mixing chamber 100.

The thus-blended mixture can be transported to the outside via the supply port 56 used as a drain port.

Figure 4A:
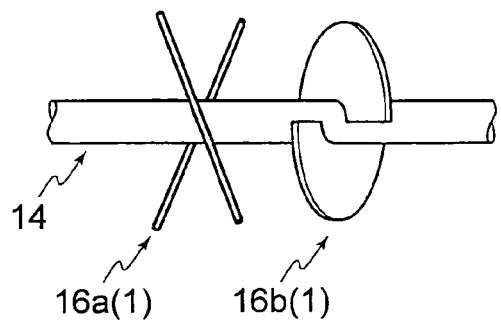
FIG. 4A shows a first exemplary embodiment of an agitation body used for an apparatus for mixing by agitation according to the present invention.
Figure 4B:
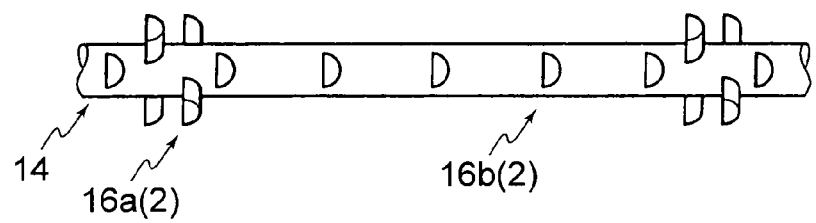
FIG. 4B shows a second exemplary embodiment of an agitation body used for an apparatus for mixing by agitation according to the present invention.
Figure 4C:
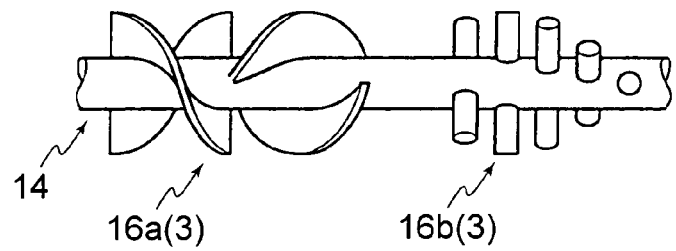
FIG. 4C shows a third exemplary embodiment of an agitation body used for an apparatus for mixing by agitation according to the present invention.
Figure 4D:
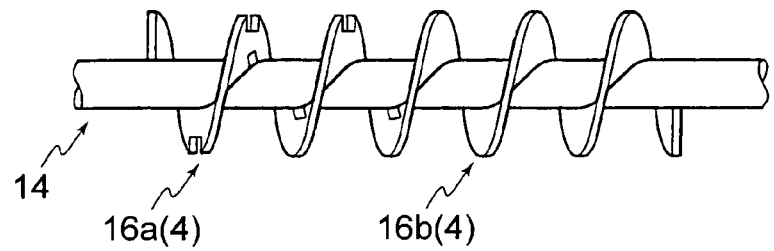
FIG. 4D shows a fourth exemplary embodiment of an agitation body used for an apparatus for mixing by agitation according to the present invention.

In this fourth embodiment, the pre-agitation mixing chamber 100 is separated from other regions in the casing 12 by a divider plate 80 in a state capable of communicating with the other regions, and the region other than the pre-agitation mixing chamber 100 is further separated by another divider plate 80 to enhance efficiency of the turbulence. The inner structure of the casing is not, however, limited to the structures described above, and the divider plates 80 may be eliminated when agitation mixing can otherwise be easily achieved, according to, for example, the properties of the combinations of powder and liquid, or the like. Although the agitation blades 16*a* and 16*b* shown in FIG. 3 are used in this embodiment, they are examples provided for the purpose of description and not of limitation, and other agitation blades such as, for example, agitation blades 16*a*(1), 16*a*(2), 16*a*(3) and 16*a*(4), and 16*b*(1), 16*b*(2), 16*b*(3) and 16*b*(4) shown in FIGS. 4A to 4D may be utilized in a vertical position appropriately selected in accordance with the location of the inlet. Further, as a substitute for the agitation blade 16*a*, a plate blade perforated with two or more holes may be used as an agitation blade. Still further, in the fourth embodiment, although helical blades are provided in the same phase relative to the axial direction as the agitation blade 16*b*, the helical blades are not limited to those provided in the above manner, and the blades may, for example, be attached to the shaft at regular intervals in different phases relative to the axial direction. The above-described agitation body may be applied to the structure according to any one of the Embodiment 1, 2, and 3. Further, by using an agitation blade obtained by adding edges to the helical blade shown in FIG. 4D, vortices which further increases the efficiency of agitation form when the agitation blade is vibrated.

Although the agitation mixer illustrated in FIG. 3 has a structure in which the pre-agitation mixing chamber 100 is mounted on the upper part, the agitation mixer is not limited to the structure shown in FIG. 3 and may be as follows. When a powder and a liquid are fed into the casing from the lower part of the casing, a space formed between the bottom of the casing and the lower divider plate 80 depicted in FIG. 3 can work as a pre-agitation mixing chamber capable of carrying out pre-agitation in a similar manner.

Embodiment 5

Figure 5:
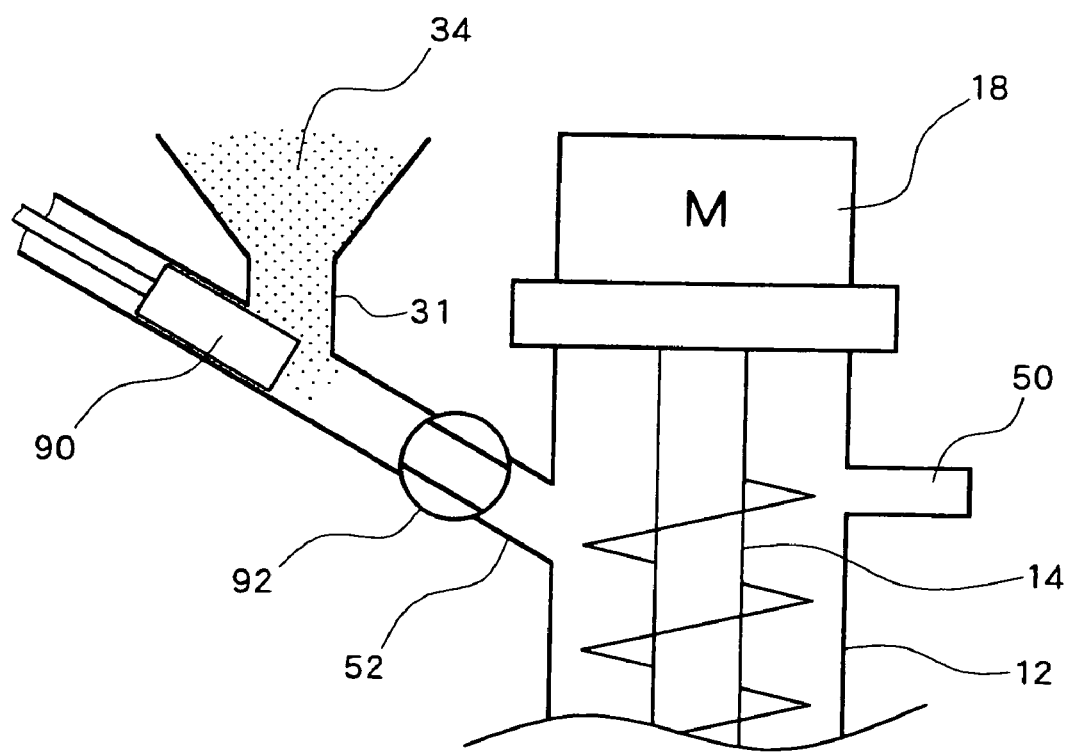
FIG. 5 is an enlarged schematic diagram showing a powder inlet side of an apparatus for mixing by agitation according to a fifth embodiment of the present invention.

Referring to FIG. 5, one end of the powder inlet duct 31 is connected to the powder inlet 51 via a ball valve 92 and the other end of the powder inlet duct 31 divides and branches in two directions, one end of which is integrally connected to a funnel for supplying the powder 34 and the other end of which includes a piston 90 capable of back-and-forth motion for pushing the powder 34. Therefore, by turning the ball valve 92 to an open position as shown in FIG. 5 and then moving the piston 90 forward to push the powder 34, the powder 34 can be fed into the casing 12, whereas by turning the ball valve 92 from the position shown in FIG. 5 to a closed position by 90 degrees and then retracting the piston 90 backward, feeding of the powder 34 into the casing 12 can be terminated, which enables intermittent feeding of the powder 34 into the casing 12. Further, when the ball valve 92 is set at the closed position, the ball valve 92 prevents the liquid from wetting the inside of the powder inlet duct 31, which facilitates stable feeding of the powder 34.

Embodiment 6

Figure 6:
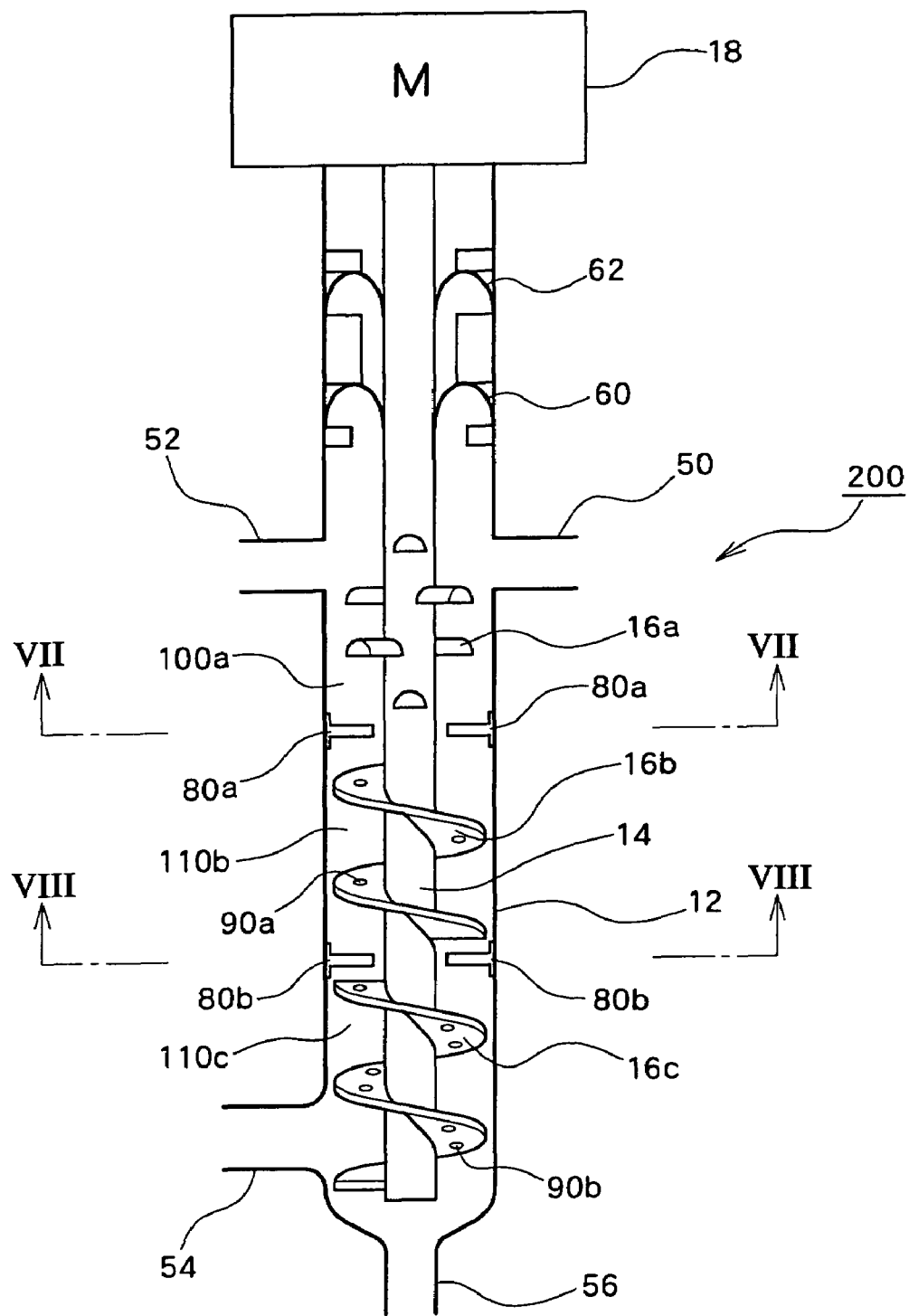
FIG. 6 is a schematic diagram showing a construction in a casing of an apparatus for mixing by agitation according to a sixth embodiment of the present invention.

FIG. 6 shows a schematic internal structure of an agitation mixer 200 according to a sixth embodiment of the present invention. In this sixth embodiment, the inside of the casing 12 is compartmentalized into a plurality of agitating chambers 110a, 110b, and 110c by the divider plates 80a and 80b as shown in FIG. 6. The shaft 14 in the casing 12 is, in a segment corresponding to the agitating chamber 110a, equipped with rod- or plate-shaped agitation blades 16a each having a top surface bowed outward shifted by, for example, 30–90 degrees from each other so as not to overlap; in a segment corresponding to the agitating chamber 110b located in the middle part of the casing 12, is equipped with a helical blade 16b perforated with holes 90a; and, in a segment corresponding to the agitating chamber 110c in the lower part of the casing 12, is equipped with a helical blade 16c perforated with holes 90b.

Figure 7:
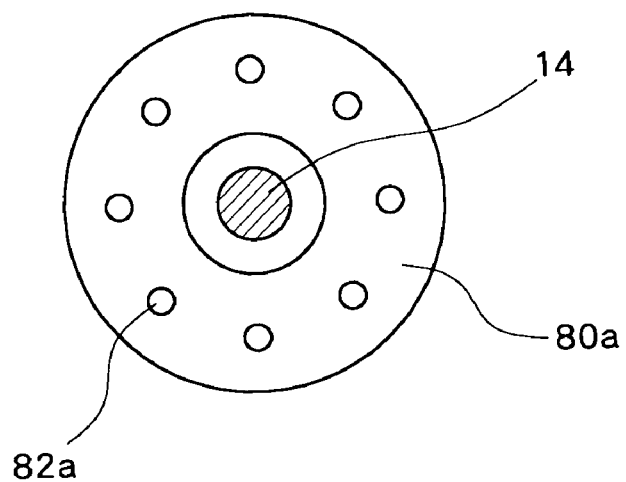
FIG. 7 is a sectional view along the line VII—VII of FIG. 6.
Figure 8:
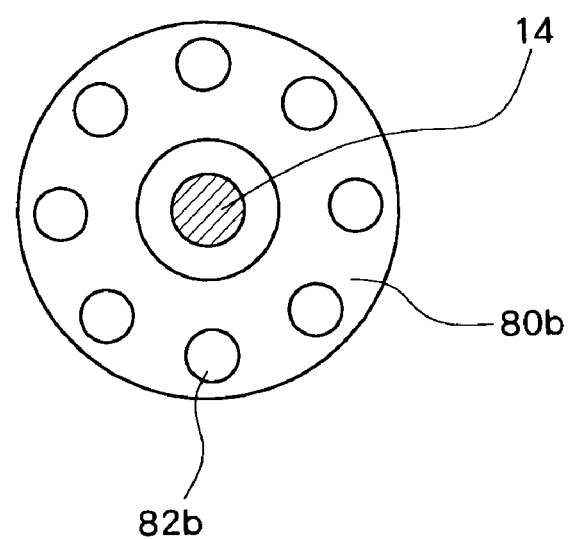
FIG. 8 is a sectional view along the VIII—VIII of FIG. 6.

FIG. 7 is a cross section taken along line VII—VII in FIG. 6 showing the divider plate 80a provided with holes 82a of smaller diameter, while FIG. 8 is a cross section taken along line VIII—VIII in FIG. 6 showing a divider plate 80b provided with holes 82b of larger diameter.

Details of the agitation mixer 200 according to the sixth embodiment will next be described. In order to carry out agitation in rough-thorough-rough sequence, the casing 12 is configured as follows. For rough agitation in the agitating chamber 100a, a rod blade whose agitation area is small or a plate blade having a top surface rounded outward and having a small agitation area is used as an agitation blade 16a to be provided in the segment corresponding to the agitation chamber 110a. On the other hand, for thorough agitation in the agitating chamber 100b, an agitation blade provided in the segment corresponding to the agitation chamber 100b has the characteristics that the holes 90a formed in the helical blade 16b are relatively small in diameter and few in number so as to enlarge the agitation area of the blade. Further, in the agitating chamber 100b, the holes 82a formed in the divider plate 8a are also small in diameter and low in number. In order to execute rough agitation in the agitating chamber 110c, an agitation blade provided in the segment corresponding to the agitating chamber 110c has the characteristics that the holes 90b formed in the helical blade 16c are large in diameter and great in number so as to make the agitation area of the helical blade 16c smaller than that of the helical blade 16b. Further, in the agitating chamber 110c, the holes 82b formed in the divider plate 80b are also relatively large in diameter and great in number.

Accordingly, when a powder is fed from the powder inlet 52 and a liquid is fed from the liquid inlet 50 into the casing 12, the outwardly rounded top surfaces of the agitation blades 16a prevent accumulated of the supplied powder on the agitation blades 16a. In this manner, by vibrating the shaft 14, further, the powder can roughly be agitated with the supplied liquid in the pre-agitation mixing chamber 100a. Still further, because the agitation blades prevent accumulation of materials to be mixed, continuous mixing operation can be achieved with no danger of interfering with movement of the shaft 14.

The mixture of the powder and the liquid blended in the agitating chamber 110a is fed through the divider plate 80a in small batches into the agitating chamber 110b where, by vibrating the shaft 14, relatively strong turbulence is generated by the helical blade 16b having a large agitation area, which enables sufficiently thorough mixing by agitation.

Then, the mixture of the powder and the liquid thoroughly agitated in the agitating chamber 110b is fed in large quantities through the divider plate 80b into the agitating chamber 110c where small turbulence, generated by the helical blade 16c having a small agitation area is small as a result of vibration of the shaft 14, roughly agitates, and therefore appropriately mixes, the mixture to achieve a desired state. The resulting mixture can be transported to the outside via the supply port 56 used as a drain port.

It should be noted that, although in the above description holes are provided in both the agitation blade and the divider plate, the arrangement of the holes is not limited to this arrangement, and holes may be formed in either the agitation blade or the divider plate. In addition, the number and size of the holes may be adjusted as appropriate.

In the agitation mixer 200 of the present invention, by reducing the number or size of the holes formed in the divider plate or the agitation blade, thorough agitation can be performed in the agitating chamber as described above. On the other hand, by increasing the number or size of such holes, rough agitation can be performed in the agitating chamber.

Further, although in the above example a cycle of rough-thorough-rough agitation is carried out, the agitation is not limited to this sequence. The agitation blade and the divider plate in the casing 12 may be configured by appropriately specifying the number and diameter of the holes to be provided in the agitation blade and the divider plate in order to enable rough-thorough, thorough-rough, or thorough-rough-thorough agitation, or other agitation as desired. Still further, although rough agitation and thorough agitation are both completed in a single agitating chamber in the above example, these two forms of agitation need not necessarily be completed in a single agitating chamber, and may be completed using a multistage agitating chamber in which a plurality of agitating chambers are connected. Moreover, although it was described that rod, plate, and helical blades are used as agitation blades in this embodiment, the agitation blades are not limited to those described above and may be configured by selecting appropriate agitation blades, such as any of those illustrated in FIGS. 4A to 4D, and specifying the diameter and number of the holes to be formed in accordance with the degree of agitation.

It is further understood that, although the foregoing is described in reference to mixing of a powder and a liquid as an example in the above embodiments 1–5, the agitation mixer of this invention is not limited to the above application and is capable of mixing a powder with another powder by feeding the other powder from the liquid inlet 50, or mixing a liquid with another liquid by feeding the other liquid from the powder inlet 52. Further, by feeding a liquid from the supply port 54, at least three constituents comprising powder-powder-liquid or powder-liquid-liquid can be mixed.

Embodiment 7

Figure 9:
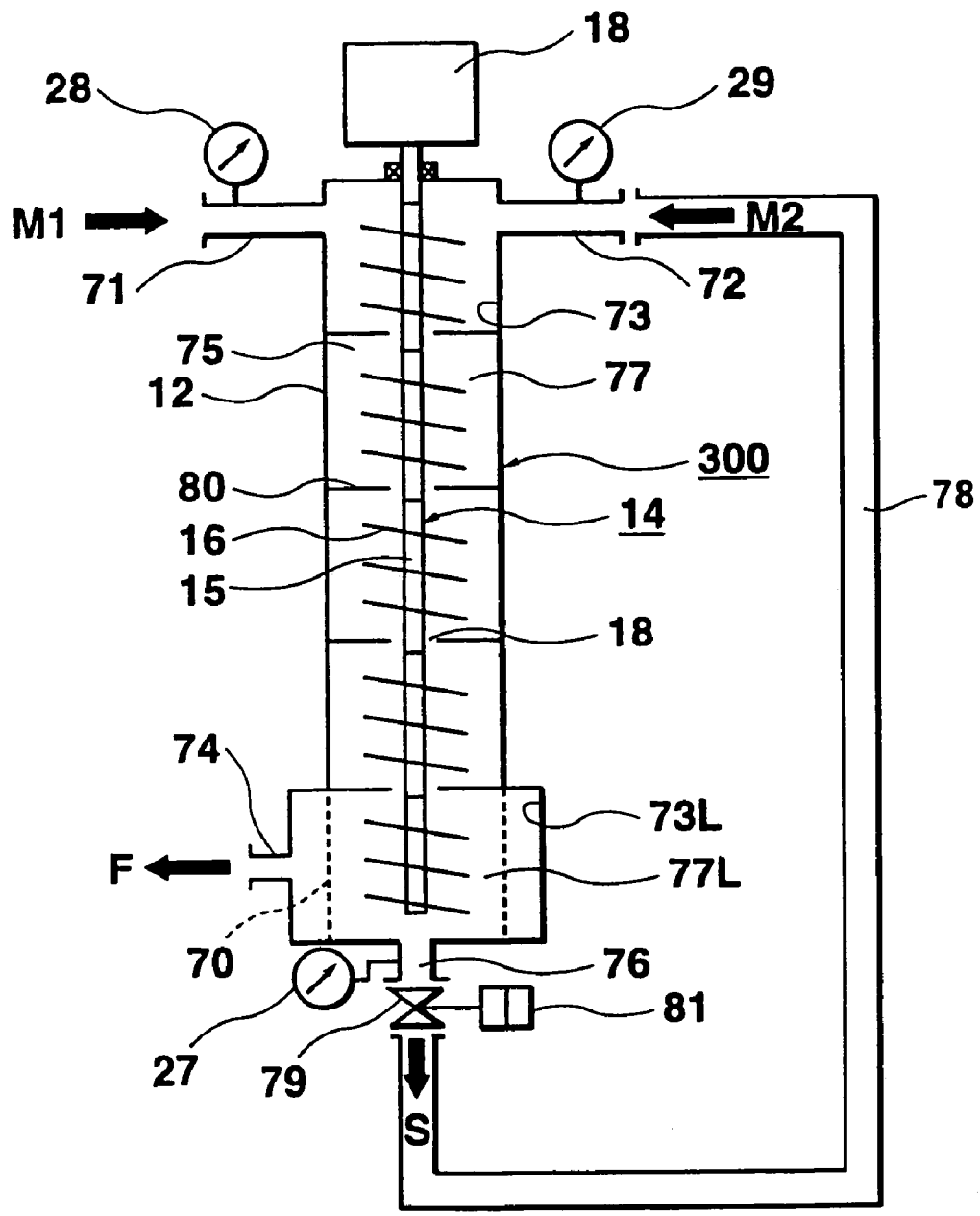
FIG. 9 is a vertical section view of an apparatus for mixing by agitation according to a seventh embodiment of the present invention.

FIG. 9 shows a schematic internal structure of an agitation mixer 300 according to a seventh embodiment of the present invention.

The agitation mixer 300 is a device for mixing at least two raw materials M1 and M2 and comprises a normal casing 12 extending in a vertical direction. A flow channel 75 in which the raw materials M1 and M2 to be agitated pass through is formed along the vertical direction in the casing 12 comprising a plurality of pipes 73 coupled to one another in the vertical direction and divider plates 80 inserted into jointing areas between the pipes 73. By alternatively stacking the pipes 73 and the divider plates 80 in the vertical direction, a mixing chamber 77 separated into multiple tiers in the vertical direction can be formed.

The top part of the flow channel 75 is established as an inflow side for the raw materials M1 and M2, and the bottom part of the flow channel 75 is established as an outflow side for the raw materials M1 and M2. The top end of the casing 12, being the inflow side, is provided with two left and right inflow ducts 71 and 72 attached to both sides of left and right of the top end of the casing 12. Each of the raw materials M1 and M2 is fed into the casing 12 from either one of the inflow ducts 71 and 72 at predetermined pressurization. The inflow ducts 71 and 72 are connected to pressure gauges 28 and 29, respectively, which enables measurement of inflow pressure into the mixing chamber 77.

The agitation body 14 is inserted into the flow channel 75. The agitation body 14 is connected to a driver 18 and actuated by the driver 18 as a vibrator capable of reciprocating vibration in up and down directions. The agitation body 14 includes the agitation blade 16 attached to the perimeter of the drive shaft 15.

A filter 70 which filters a mixture is installed on the flow channel 75 in the mixing chambers 77 and 77L so as to enclose the agitation body 14. Because each of the mixing chambers 77 and 77L, in each of which is present both a dissolved fluid and an undissolved material, include a filter 70, only the dissolved fluid filtered by the filter 70 is drained out.

A filtration member having a mesh (a fine mesh) made of stainless steel or a ceramic whose roughness at the micron level, a reverse osmosis membrane, a polymer membrane (a nanofilter membrane), or the like may be used as the filter 70. The filtrated material (F) which passed through the filter is drained out from the casing 12 through the filtered drain port 74. On the other hand, undissolved material (S) is drained out from an unfiltered drain 76, and then returned back to the inflow ducts 71, 72 through exemplary piping 78 as appropriate so as to circulate in the flow channel 75 for further mixing by agitation.

In the agitation mixer 300, by supplying two or more raw materials (fluids to be mixed) inside the casing 12, and by vibrating the agitation body 14, mixing of the raw materials by successive agitation is performed. Before feeding, the fluids to be mixed may be pre-mixed in a simple or rough manner. Because the fluids to be mixed fed into the agitation mixer 300 collides with the agitation body 14 and the internal wall of the mixing chamber 77 in the mixing chamber 77 which is segmented by the divider plate 80, the flow velocity of the fluids to be mixed is limited, and sufficient effects of mixing by agitation can be obtained by vibration of the agitation body 14.

For example, when the present agitation mixer is used for dissolving a powder, although almost all of the powder can be dissolved through mixing by agitation, a small volume of the powder is left as undissolved material which accumulates in the casing 12 and causes clogging of the filter 70. However, the undissolved material adhered to the internal wall of the filter 70 is scraped off by the agitation blade 16 vibrating in the mixing chambers 77 and 77L surrounded by the filter 70, and is then re-dissolved. A very small volume of the undissolved material is drained out from the unfiltered drain port 76. On the other hand, in a chemical synthesis reaction, when reaction is completed, the amount of compounds increases, which causes the filter 70 to clog. More specifically, as the amount of the accumulated undissolved material or unreacted material increases, the internal pressure of the mixing chamber 77L serving as a mixture ejecting section increases beyond a predetermined value. After the internal pressure reaches the predetermined value, an open/close valve 79 for the unfiltered drain port 76 is opened so as to drain the undissolved material or the unreacted material from the casing 12 through the unfiltered drain port 76, and, simultaneously, a pressure at an inflow section of the raw material drops in accordance with the outflow of the mixture.

The open/close valve 79, which automatically opens when the pressure at the unfiltered drain port 76 exceeds a predetermined value, is mounted on the unfiltered drain port 76. The unfiltered drain port 76 or the filtered drain port 74 has a structure in which the unfiltered drain port 76 or the filtered drain port 74 can be switched to establish a connection with the inflow duct 71 or 72 for feeding the raw materials provided on the casing 12 via an additional piping 78. Accordingly, the unfiltered material drained from the unfiltered drain port 76 or filtered material drained from the filtered drain port 74 can be refluxed into the casing 12, which enables re-agitation and sufficient mixing of the raw materials M1 and M2.

The middle of the divider plate 80 is perforated with flow holes 78 which take the shape of a portion of the flow channel 75 in which the fluid to be mixed passes through. The bottom part of the flow channel 75, i.e. an outlet side being a bottom of the casing 12, is connected with the top end of the unfiltered drain port 76 extending downward, and the open/close valve 79 is installed near the midpoint of the unfiltered drain port 76. The open/close valve 79 automatically opens while opposing a pressing force of pressurized air or an elastic body 81 such as a spring. A diaphragm air valve having a function of a safety valve can be used as the open/close valve. Further, by installing a pressure gauge 27 which measures an internal pressure on the unfiltered drain port 76, opening/closing of the open/close valve 79 can be controlled according to a pressure signal from the pressure gauge 27.

The cylinder-shaped filter 70 is attached to the mixing chamber 77L constituting the lowermost stage of the casing 12. The filter 70 surrounds the outer perimeter of the flow channel 75 in the pipe 73L situated in the lowermost stage, and works as a sieve for separating a mixture. As a specific filter 70, a filtration member having a fine mesh and made of stainless steel or a ceramic is used. One end of the filtered drain port 74 extending to the lateral direction is connected to a side surface of the pipe 73L situated in the lowermost stage of the casing 12. From the filtered drain port 74, a liquid mixture isolated by the filter 70 is drained off to the outside of the casing 12.

It should be noted that, in a case of dissolution, undissolved materials (unfiltered materials) remaining in the mixing chamber 77L can be returned to the flow channel 75 for re-circulation. To achieve re-circulation, piping 78 is constructed by connecting the bottom end of the unfiltered drain port 76 with inflow ports 71 and 72 through piping using a directional control check valve (not illustrated).

Further, because the filter 70 for separating a mixture is installed in the casing 12 so as to enclose the agitation body 14, dissolved liquid obtained, for example, in a dissolving operation on a powder is filtrated and separated by the filter 70. On the other hand, materials made up of molecules of small size, for example, an unreacted raw material or a solvent, in which polymerization reaction was not sufficiently completed due to deficient mixing are also filtrated. The filtrated materials are drained from the filtered drain port 74 to the outside of the casing 12. After ejection, the filtrated materials may be refluxed from the filtered drain port 74 to the inflow ducts 71 and 72 for recycling.

Because a product mixture contains none of the undissolved materials and residues described above, a homogeneous product mixture including small irregularities can be obtained. Further, because a non-defective product is filtered and separated from a defective product, only the non-defective product can be extracted. Moreover, when unreacted materials or undissolved materials remain as a result of insufficient mixing or the like, the materials may be refluxed into the casing and sufficiently mixed by repeating agitation in the casing 12. In other words, by enhancing efficiency of reaction achieved by mixing of raw materials by agitation, generation of detective product can be suppressed to the barest minimum, which significantly improves product yields.

As described above, the agitation mixer according to the present embodiment may be modified by changing the shape or the agitation area of the agitation blade 16, perforating the divider plate 80 with holes, and/or using the mixing chamber 77 in the uppermost stage as the above-described pre-agitation mixing chamber.

Operation of the agitation mixer as described above will next be described.

In an agitation mixer configured as described above, after feeding fluid raw materials M1 and M2 into the casing 12, the agitation body 14 vibrates up and down while the raw materials M1 and M2 are passing through the casing 12, and mixing by agitation is carried out in the flow channel 75. In this process, the raw materials M1 and M2 collide with the agitation body 14 and the divider plates 80 and flow downward passing through the flow holes in the divider plates 80, which curbs descending velocity of the raw materials M1 and M2. The up and down vibration of the agitation body 14 ensures the efficiency of the agitation mixing. The casing 12, into which raw materials M1 and M2 in gaseous form, liquid form, powder form, or the like will be inserted, is used for carrying out dissolution, chemical synthesis reaction, etc.

Dissolution carried out using this agitation mixer will next be described. In this case, the bottom end of the unfiltered drain port 76 is connected with the inflow duct 71 so as to reflux the undissolved material S ejected from the unfiltered drain port 76 into the casing 12 for recycling. Taking dissolution of liquid-to-powder as an example, a solvent liquid and a grain powder are used as the raw materials M1 and M2, respectively. By mixing both of the raw materials M1 and M2 to initiate dissolution reaction, the grain powder M2 is dissolved by the solvent liquid M1. Consequently, a dissolved substance F of the grain powder M2 passes through the filter 70 via the flow channel 75 in the mixing chamber 77L situated in the lowermost stage, and then moves to a perimeter side of the mixing chamber 77L.

The dissolved substance F moved to the outside of the mixing chamber 77L is ejected from the filtered drain port 74 to the outside of the casing 12, and thereby just the dissolved substance F containing no undissolved material S can be extracted. On the other hand, a grain powder which is not dissolved due to deficient mixing, i.e. undissolved material S is returned back to the inflow duct 72 from the unfiltered drain port 76 and then again mixed by agitation. In this manner, because the occurrence of undissolved components resulting from deficient mixing is suppressed, product yields can be improved correspondingly.

Figure 10A:
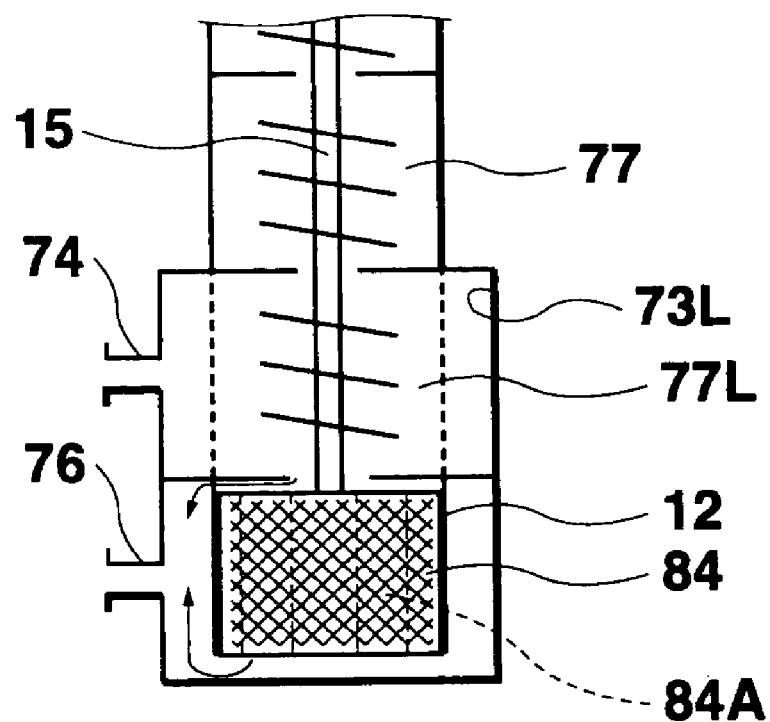
FIG. 10A is a partial vertical section view of an apparatus for mixing by agitation according to the seventh embodiment of the present invention.
Figure 10B:
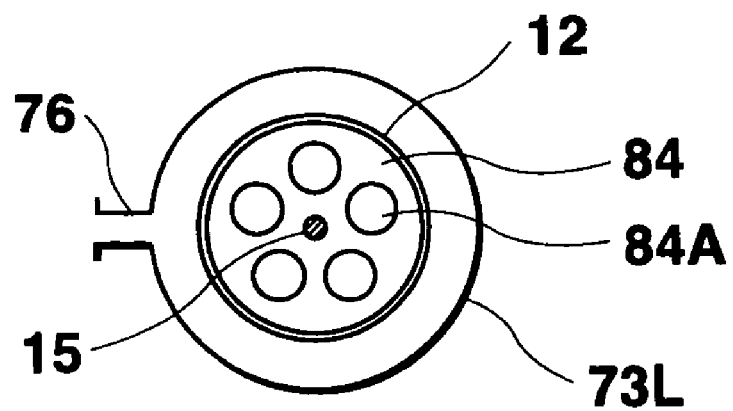
FIG. 10B is a transverse cross-section view of the lower part of an apparatus for mixing by agitation according to the seventh embodiment of the present invention.
Figure 11A:
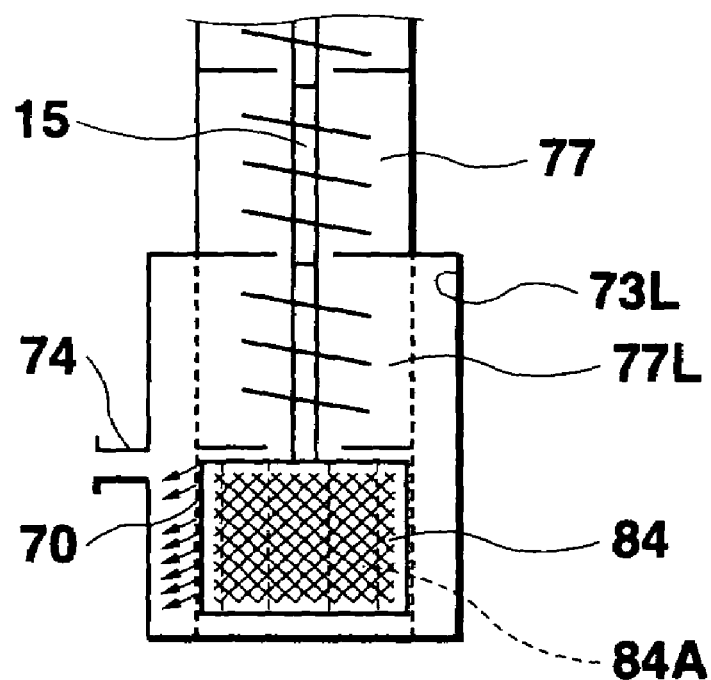
FIG. 11A is a partial vertical section view of an apparatus for mixing by agitation according to an eighth embodiment of the present invention.
Figure 11B:
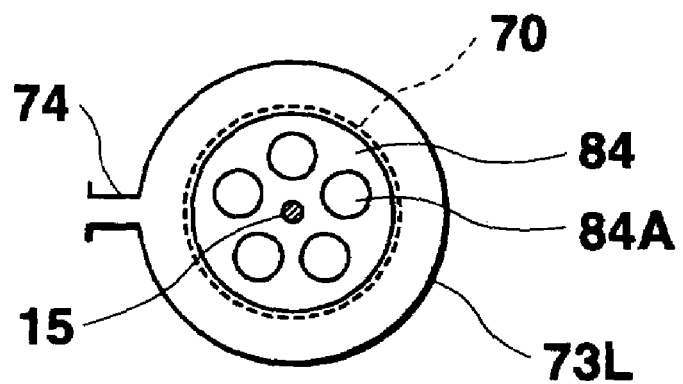
FIG. 11B is a transverse cross-section view of the lower part of an apparatus for mixing by agitation according to the eighth embodiment of the present invention.

As shown in FIGS. 10A, 10B, 11A, and 11B, a grinding spindle 84 for crushing undissolved substances (lumps) which remain after dissolution of a powder can be mounted to further enhance dispersion of the powder, and further improve dissolution efficiency. More specifically, the grinding spindle 84 is attached to the drive shaft 15 so as to be interlocked with vibration for agitation of the agitation body 14. Regarding an installation method, the grinding spindle 84 may be provided independently from the filter 70 as shown in FIGS. 10A and 10B, or may be provided in the filter 70 as shown in FIGS. 11A and 11B. In either case, undissolved substances are squeezed and then crushed between the outer surface of the grinding spindle 84, which is finished in file form, and the internal wall of the casing 12 or the internal wall of the filter 70. It should be noted that permeable holes 84A penetrating the grinding spindle 84 in a vertical direction are formed in the grinding spindle 84 as jet paths, to thereby reduce resistance of a pressing force exerted on the grinding spindle 84 during its downward movement as well as preventing its pulsing movement.

The most distinctive characteristic of the agitation mixer is that the filter 70, which encloses the flow channel 75, is provided in a state being connected with the lower part of the agitation mixer. Through the filter 70, a dissolved liquid is removed from the mixing chamber 77L via the filtered drain port 74 after the completion of mixing by agitation. On the other hand, the undissolved substance S is refluxed into the inflow duct 71 or 72 for recycling in the casing 12.

Next, reaction initiated by the agitation mixer will be described.

As an example of liquid-to-liquid reaction, an additive is mixed with a monomer to initiate a reaction, which causes the viscosity to increase as the monomer is polymerized. The increased viscosity in turn causes the pressure within the casing 12 to exceed a predetermined value. When this predetermined value is exceeded, the open/close valve 79 opens while opposing the pressing force of the elastic body 81, which enables materials incapable of passing through the filter 70, i.e. mixed substance S whose molecular size is large, to be ejected from the unfiltered drain port 76.

On the other hand, a substance insufficiently mixed to such an extent that the viscosity thereof is not increased, i.e. a substance whose molecular size is small due to deficient mixing, passes through the filter 70 via the flow channel 75 in the mixing chamber 77L situated in the lowermost stage, and then moves to the perimeter of the mixing chamber 77L. The filtered substance F then travels from the filtered drain port 74 to the outside of the mixing chamber 77L, where the filtered substance F is returned back to the inflow duct 71 or 72. Then, the filtered substance F is fed into the casing 12 again and further mixed by agitation. Accordingly, as generation of unreacted substances due to deficient mixing is prevented, product yields can be improved correspondingly.

In this case, only the substances, in which sufficient reaction occurs through mixing by agitation, are ejected out of the casing 12, and that unreacted substances are returned to within the casing. In other words, because compounds are filtered in the final stage where reaction is completed, only products of sufficient quality containing sufficiently few unreacted substances are extracted. It should be noted that the present invention is not limited to the above-described embodiment and may be used for various applications. For example, although in the above embodiment the inflow duct for a raw material is attached to the upper part of the casing 12 and the drain port for a mixture is attached to the lower part, these ducts may be attached conversely to carry out mixing by agitation while causing an inflow of the raw material to flow upward depending on a type or a raw material or reaction, or depending on physical properties of a product to be extracted after reaction.

Next, a method for mixing by agitation according to the present embodiment will be described.

The method for mixing by agitation according to this embodiment is a method such that power and liquid are mixed by vibratory agitation using, for example, the agitation mixer 10 depicted in FIG. 1 after simultaneously feeding the powder and the liquid into a casing including a vibratory agitation blade.

In another agitation mixing method according to this embodiment comprises the steps of a mixed powder forming process in which two or more powders are premixed to prepare a mixed powder, and a vibratory agitation process in which the mixed powder and the liquid are simultaneously fed into the casing and then agitated through vibration.

For example, in a case where a first mixture is prepared by mixing a paste with a solvent, and a second mixture is subsequently prepared by adding a curing agent or the like to the first mixture, when the first mixture has high viscosity, it is normally difficult to uniformly admix the cure agent to the first mixture. However, by premixing two or more powders and then admixing the premixed powders with a liquid according to the method for mixing by agitation of this embodiment, the process of obtaining a uniform admixture of the curing agent is greatly simplified.

In still another method for mixing by agitation according to this embodiment, the degree of mixing by agitation within the flow channel is changed as appropriate. In this manner, it becomes possible to roughly agitate an object less prone to be agitated and then thoroughly agitate the roughly agitated object, which results uniform mixing. Further, by performing rough agitation after thorough agitation, conditions of an agitated mixture can be corrected; for example, a mixture containing a foam can be degassed.

The agitation mixer and the method for mixing by agitation according to any one of the embodiments described above may also be used for manufacturing, for example, silicon oil, silicon products such as silicon gum, paint, cosmetics, food, and slurry, such as cement. In particular, it is possible to prepare a mixture with viscosity as high as those of mixtures now commonly manufactured by agitators such as a kneader. In addition, a powder and a liquid to be mixed even at a weight ratio of approximately 1 to 1 can be mixed uniformly, as proved by experiment.

EXAMPLES

Examples of mixing powder and liquid by agitation using the agitation mixer of this invention will be described below.

It is to be understood that the following examples are provided only for explanation, and not for limitation to the scope of this invention.

Example 1

Preparation of Cosmetic Foundation:

TABLE 1

| Bulk: | 100 parts by weight |
|---|---|
| Powder: Fluoridized talc | 17 weight percent |
| Fluoridized mica | 39 weight percent |
| Nylon Powder | 5 weight percent |
| Zinc Stearate | 3 weight percent |
| Fluoridized skin color pigment | 30 weight percent |
| Ethyl-para-hydroxybenzoate | 1 weight percent |
| Oil: Silicon Oil (6 mm$^2$/s) | 2 weight percent |
| Liquid Paraffin | 3 weight percent |
| Additive Liquid: | 5 parts by weight |
| Liquid: 1,3-butylene glycol | 6 weight percent |
| Purified Water | 94 weight percent |

After the powders listed in Table 1 were crush-mixed, the oils were admixed to the crush-mixed powders to prepare 100 parts by weight of bulk for cosmetic foundation. Then, 5 parts by weight of liquid consisting of 1,3-butylene glycol and purified water were fed from the liquid inlet 50 of the mixer shown in FIG. 1, and 100 parts by weight of bulk were fed from the powder inlet 52 of the mixer into the casing 12 and then mixed by vibratory agitation to obtain a uniform mixture. The obtained mixture was then filled into a circular midsize plate, subjected to pressing, and then desiccated for 9 hours at 50° C. The strength of resultant pressed goods were measured by drop testing in which a solid powder cosmetic material filled in the midsize plate was fitted in a powder compact and then the powder compact was dropped from a height of 50 cm onto a plywood laminate having a a thickness of 2 cm. In the test, a fine result of 50 times till the solid powder cosmetic material peels off the powder compact was obtained.

Example 2

Preparation of Silicon Macromolecule Coated Powder:

As a powder, 100 grams of spherical silica US-10 (having an average particle diameter of 10 μm and manufactured by MITSUBISHI RAYON Co., Ltd.) were fed from the powder inlet on an agitation mixer according to the present invention as shown in FIG. 1. Meanwhile, 5 grams of phenylpolysilane were dissolved into 65 grams of toluene, which was fed as a liquid from the liquid inlet on the agitation mixer of this invention. After vibratory agitating of the powder and the liquid for one minute, a slurry was obtained. The obtained slurry was treated at a temperature of 80° C. under 6 kilopascals of pressure to evaporate 30 grams of toluene. As a result phenylpolysilane treated spherical silica, which was dispersed over the remaining toluene while having fluxionality, was obtained. Then, this toluene phase containing phenylpolysilane treated spherical silica and 35 grams of water were individually inserted into the agitation mixer of this invention and subjected to vibratory agitation, which decreased fluxionality because the water was mixed with the toluene phase containing phenylpolysilane treated spherical silica. By then simultaneously evaporating 35 grams of toluene and 30 grams of water, it was shown that the phenylpolysilane treated spherical silica had maintained its spherical shape with almost no cohesion.

Example 3

Preparation of Liquid Silicon Gum Compound:

First, 45 parts of straight-chain dimethylpolysiloxane (with viscosity of 10,000 cSt), the molecular chain of which was sealed by dimethylvinyl silyl group at both ends, and 3 parts of 1,1,1,3,5,7,7,7-octamethyl-3,5-dihydroxytetrasiloxane were mixed. To this mixture, 55 parts of silicon powder (NIPSIL LP (registered trade mark) manufactured by Nihon Silica) were admixed so as to prepare a premixed powder. Next, the premixed powder was fed from the powder inlet on the agitation mixer of this invention, while 116 parts of the above dimethylpolysiloxane were fed from the liquid inlet of the agitation mixer of this invention, and the temperature was gradually increased from 10° C. to 280° C. from the inlets to a downstream direction. As a result, a liquid silicon rubber base was obtained from the drain port. Further, relative to 100 parts of the obtained liquid silicon rubber base, 25 parts of straight-chain dimethylpolysiloxane, 3 parts of methyl hydrogen polysiloxane as a crosslinking agent, 0.3 parts of 1% isopropyl alcohol solution being hexachloro-platinic acid as a platinum catalyst, and 0.3 parts by weight of ethynylcyclohexanol as a reaction inhibitor were admixed, and the mixture was hardened for 10 minutes at 120° C. to manufacture a sheet. A test piece of the sheet was subjected to reciprocating motion for extension of 100% at a velocity of 300 repetitions per minute (the test piece was repeatedly extended between 0–100%) in compliance with the JIS-K-6301 standard, to measure the number of reciprocating motions until the test piece was broken. By measurement, it was shown that a fatigue limit of the test piece was 12.5 million times, which was a preferable result.

Through use of the agitation mixer according to the present invention in the above application examples, powder and liquid were uniformly mixed. Further, it was found that all of the above products obtained as a result of mixing had excellent characteristics. It should be noted that, by using the agitation mixer and method for mixing by agitation for application other than the above examples, a mixture which is uniformly mixed by agitation and a compound which is uniformly reacted can be prepared from any combination of liquid and powder for any desired mixing ratio of liquid and powder, and with any viscosity.

As has been described, through use of the present invention, various types of powders and liquids can be easily and uniformly mixed by vibratory agitation. Although the preferred embodiments of the present invention were described using illustrative examples, it is to be understood that the invention is not limited to the specific embodiments thereof and embraces all embodiments defined by the appended claims.

What is claimed is:

1. An apparatus for mixing by agitation comprising:
   a casing having a flow channel through which may pass a fluid;
   an agitation body consisting of a shaft installed in said casing and connected to a vibration source, and one or more agitation blades attached to the perimeter of the shaft, a filter being installed in said casing so as to enclose said agitation body;
   at least two inlets for feeding a liquid or a powder into said casing,
   a plurality of agitating chambers separated from other regions in said casing by divider plates in a state capable of communicating with the other regions,
   a filtered drain port from which a mixture filtered by said filter is drained, and
   an unfiltered drain port from which a mixture incapable of being filtered by said filter is drained, wherein
   the unfiltered drain port is connected to an open/close valve which opens when an internal pressure at the unfiltered drain port reaches to or goes beyond a predetermined value, or an open/close valve which opens at regular time interval,
   at least one of the plurality of agitating chambers is a pre-agitation mixing chamber to which the at least two inlets are attached, and
   a portion of the agitation blades are positioned in the pre-agitation mixing chamber on the agitation body and are provided in such a manner that the shape of the agitation blades and/or the agitation area of the agitation blades can be changed according to the degree of agitation desired.

2. An apparatus for mixing by agitation according to claim 1, wherein one or more agitation blades of at least one type, selected from a plurality of types of agitation blades each having a unique shape, are mounted on the perimeter of the shaft of the agitation body.

3. An apparatus for mixing by agitation according to claim 1, wherein said divider plate is perforated with one or more holes and one or both of the number or the size of the holes is set so as to vary the degree of agitation within the casing.

4. An apparatus for mixing by agitation according to claim 1, wherein said agitation blade is perforated with one or more holes according to the agitation area and one or both of the number or the size of the holes is set so as to vary the degree of agitation within the casing.

5. An apparatus for mixing by agitation according to claim 1, further comprising a coupling duct which connects said filtered drain port or unfiltered drain port to at least one inlet duct.

* * * * *

UNITED STATES PATENT AND TRADEMARK OFFICE
CERTIFICATE OF CORRECTION

| | | |
|---|---|---|
| PATENT NO. | : 7,090,391 B2 | Page 1 of 1 |
| APPLICATION NO. | : 10/665158 | |
| DATED | : August 15, 2006 | |
| INVENTOR(S) | : Toru Taniguchi | |

It is certified that error appears in the above-identified patent and that said Letters Patent is hereby corrected as shown below:

ON THE COVER PAGE:

Section (30) - Foreign Application Priority Data, should read

--September 25, 2002  (JP) .......... ~~2003-278598~~ 2002-278598--

Signed and Sealed this

Twenty-eighth Day of November, 2006

JON W. DUDAS
*Director of the United States Patent and Trademark Office*